United States Patent [19]
Roebelen, Jr.

[11] Patent Number: 5,483,993
[45] Date of Patent: Jan. 16, 1996

[54] MAINTAINABLE IN-LINE FLUID CONNECTOR

[75] Inventor: George J. Roebelen, Jr., Suffield, Conn.

[73] Assignee: United Technologies Corporation, Hartford, Conn.

[21] Appl. No.: 316,971

[22] Filed: Oct. 3, 1994

[51] Int. Cl.$^6$ .................................................. F16L 29/00
[52] U.S. Cl. ...................... 137/614; 251/89.5; 251/149.9
[58] Field of Search ........................... 137/614; 251/89.5, 251/149.6, 149.8, 149.9

[56] References Cited

U.S. PATENT DOCUMENTS

| | | | |
|---|---|---|---|
| 2,728,589 | 12/1955 | Williams | 251/149.8 |
| 4,029,125 | 6/1977 | Steydle et al. | 251/149.6 X |
| 4,565,211 | 1/1986 | Denney | 251/149.6 X |

*Primary Examiner*—Martin P. Schwadron
*Assistant Examiner*—Kevin L. Lee
*Attorney, Agent, or Firm*—Norman Friedland

[57] ABSTRACT

The in-line fluid connector serves to separate the upstream and downstream portions of flexible or semi-flexible conduit to allow maintenance on the flow system. The connector includes a female valve and sleeve attached to one portion of the conduit and a male housing attached to the other portion of the conduit. An installation tool that is either hand operated or motor driven consists of a pushout rod whose outer diameter fits into the sleeve for pushing the valve out of the female housing and into the sleeve and for positioning seals to straddle the passageways formed in the female portion and seals in the pushout rod to prevent leakage from the upstream and downstream portions. A locking ring secures the female and male portions and a ball screw motor driven actuator may be used to stroke the installation tool.

10 Claims, 4 Drawing Sheets

5,483,993

MAINTAINABLE IN-LINE FLUID CONNECTOR

TECHNICAL FIELD

This invention relates to fluid connectors and particularly to fluid connectors that permit the separation of the upstream and downstream portions of a conduit without incurring leakage and particularly adaptable for zero or low gravity applications.

BACKGROUND ART

U.S. Pat. No. 3,707,757 entitled "In-Line Replacement Tool" granted to T. E. Fitzsimmons and the inventor of this patent application on Jan. 2, 1973 and assigned to the assignee common to this patent application teaches the use of a replacement tool for replacing the spool of a spool valve in such a manner so as to keep the loss of fluid in the system to a minimum. The present invention relates to this patent to the extent that it pertains to separation of the fluid line without incurring loss of fluid in the line to allow repair or replacement of components in the system being connected by the conduit.

In the structure disclosed in U.S. Pat. No. 3,707,757 the spool is removed by removably attaching a container housing a replacement spool and a replacement installation tool on one end of the spool valve and attaching a blank housing with an accommodating bore on the other end and by the replacement installation tool sliding the replacement spool into the spool valve while forcing the spool being replaced into the accommodating bore and then removing the used parts and the in-line replacement installation tool. As will be described in further detail hereinbelow, the in-line replacement installation tool of the present invention includes a fluid connector that allows the separation of a fluid conduit so that the upstream portion of the conduit and the downstream portion of the conduit when separated are sealed to avoid leakage of the fluid in the portions of the conduit remaining secured to the connector from leaking to ambient.

As one skilled in the art will appreciate, space vehicles that operate in outer space and in a zero or near zero gravity field are designed to include systems that include a plurality of conduits for conducting fluid in many of the onboard systems. There is a need to maintain these systems while in space to assure that should a malfunction occur, the system can be repaired so as not to jeopardize the mission or render discomfort to the passengers. Obviously, this requires a replacement of certain components and the procedure for accomplishing the same must be relatively simple and must be done without the loss of fluid. The present invention solves this problem by providing a connector formed from a male half and female half, both of which define a curved passageway interconnecting the upstream and downstream ends of a conduit or fluid conducting line. The female half or insert includes an in-line slidable member and a sleeve that has shut-off capabilities. A replacement tool attached to the male housing includes a slidable cylindrical member that is inserted into a central bore formed in the male housing and includes sealing means to block off the flow of fluid when the housing is removed from the female half. The in-line slidable member and sleeve serve to seal the fluid when the female portion is removed from the male housing. The replaceable tool includes seal means to seal off the male housing when removed. The separation of the male and female portions of the connector may be operated manually or by a motor driven means.

SUMMARY OF THE INVENTION

The object of this invention is to provide means for removing portions of a fluid system by including fluid connectors that are capable of separating the upstream and downstream portion of the fluid system without incurring a loss of fluid.

A feature of this invention is a slidable in-line installation tool that slides a slidable cylindrical member that includes a curved passageway of the connector and a cooperating female sleeve surrounding a portion of said cylindrical member removable inserted in the end of a central bore formed in a female housing and into sealing engagement to allow the removal of the female housing from the male sleeve without incurring leakage from either end of the conduit separated at the junction of the connector.

Another feature of this invention is the utilization of the in-line installation tool to cooperate with the female housing to form a seal for one of the ends of the conduit.

Another feature of this invention is the inclusion of a locking ring that provides locking of the female and male components that is characterized for its ease of uniting and separating these component parts.

Another feature of this invention is a quick disconnect in-line fluid connector that is characterized as simple to manufacture and assemble and disassemble and is adaptable for zero or near zero gravitational conditions and when powered operated the forces are reacted within the assembly thus obviating the necessity of requiring the person performing the disconnection to resist the translational or rotational forces.

Another feature of this invention is that the disconnection is easily facilitated either by manual means or by a powered operated means such as a ball screw actuator that may be powered by battery or other powered operated means.

The foregoing and other features of the present invention will become more apparent from the following description and accompanying drawings.

BEST MODE FOR CARRYING OUT THE INVENTION

While this invention is being described in its preferred embodiment as being adaptable for use in a zero or low gravity environment, it is to be understood that the invention has application for other environments particularly where it is desirable to separate a flexible or partially flexible fluid conduction line at a junction point by a connector that is capable of preventing loss of fluid in the separated lines.

Figure 1:
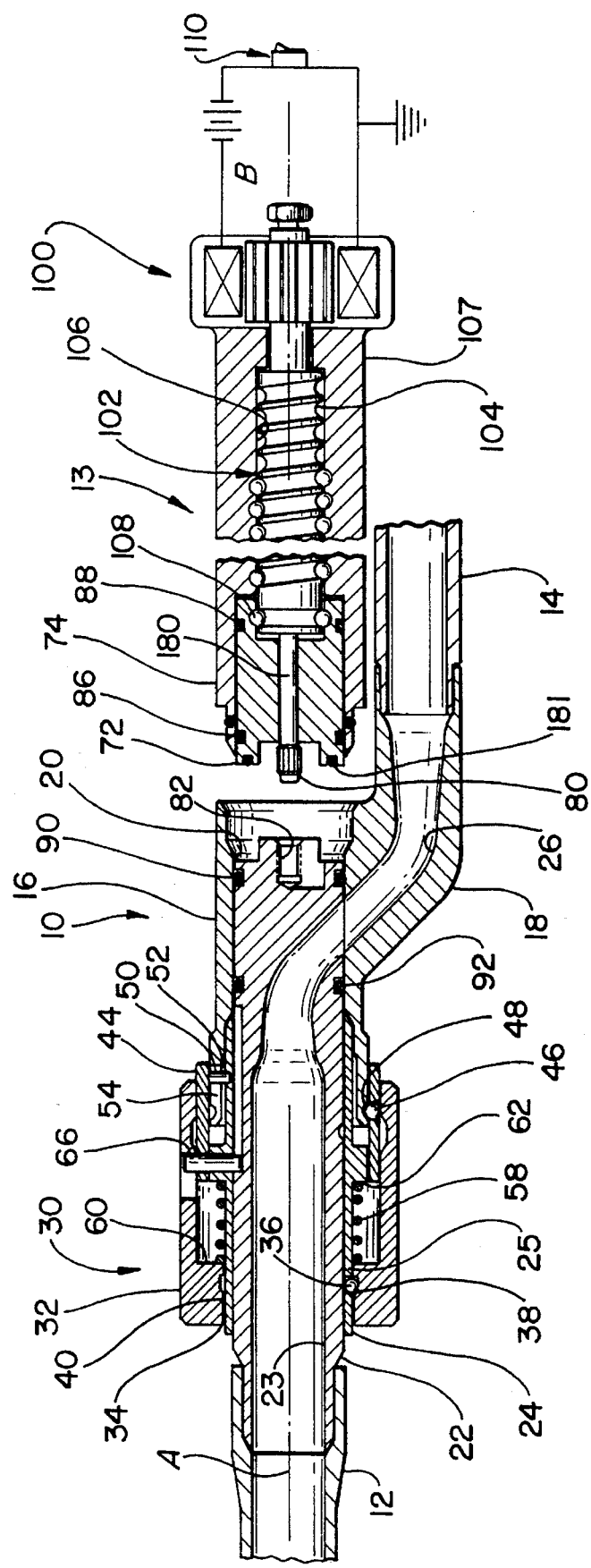
FIG. 1 is a view in elevation in section illustrating the in-line connector and installation tool of this invention.

The invention can best be understood by referring to FIGS. 1–5 and particularly to FIG. 1 which is a sectional view of the in-line fluid connector generally indicated by reference numeral 10 and the upstream conduit 12 and the downstream conduit 14 and the installation tool generally indicated by reference numeral 13. Obviously the ends of the conduits 12 and 14 will be connected in any suitable manner to the respective ends of the connector 10, say, by welding or by providing swaged joint or the like.

The in-line fluid connector 10 includes a female housing 16 that may be generally cylindrical in shape having a branch portion 18 laterally displaced from the central axis A of the female housing 16. The open ended central bore 20 centrally formed coaxially with the central axis A extends through the female housing and is accessible from either end. A male member consisting of inserts 22 and 24 fit into the end of bore 20. The insert 22 of the male member is cylindrically shaped and defines a valve member that includes a main passageway 23 that is curved at its aft end extending laterally outward relative to the central axis A to align with the curved passageway 26 formed in branch portion 18 of female housing 16 when the male and female portions are assembled. The passageways 23 and 26 connect the upstream conduit 12 and the downstream conduit 14, respectively. The insert 24 of the male member defines a sleeve that is dimensioned to fit into an increased diameter portion of bore 20 formed at the aft end thereof and the inner diameter of sleeve 24 aligns with the inner diameter of bore 20 to form a straight through cylindrically shaped surface 25 for defining a sliding surface for insert 22 when the connector 10 is disconnected as will be described in more detail hereinbelow.

The female and male portions of the connector 10 are secured in the locked position by the locking ring generally illustrated by reference numeral 30 that consist of outer ring 32 having a reduced diameter portion 34 whose inner diameter complements the outer diameter of sleeve 24 and when assembled extends beyond the fore end of female member 16. Three detent balls 36 secured in corresponding holes in sleeve 24 fit into annular groove 38 formed on the inner diameter of the reduced diameter portion 34 and prevent the sleeve 24 of the locking ring assembly 30 from being unlocked in the connected position as shown in FIG. 1. The opposite end of lock ring 30 includes an intermediate ring 44 that is sandwiched between the inner diameter of outer ring 32 and the outer diameter of the female housing 16 and is fastened to sleeve 24 by means of pin 66. Three detent balls 46 secured in corresponding holes in sleeve 44 fit into annular groove 48 formed in the outer diameter of housing 16 and lock the female member 16 to the intermediate ring 44 preventing separation of the in-line connector. Pin 50 extending radially into a hole 52 formed in sleeve 24 guides the female housing 16 relative to sleeve 24 and orients the two pieces for proper alignment of the passages 23 and 26. Pin 50 fits into slot 54 formed in the fore end of housing 16 and is trapped between the split ring 46 and the inner end of the slot 54. Spring 58 which is a coil spring, bears against the shoulder 60 of locking ring 30 and the flange 62 extending radially outward from sleeve 24. The locking ring 30 carries a guide pin 66 that rides in slot 68 formed on the outer diameter of valve member 22 for limited axial travel thereof for the removal of the male and female portions when the fluid connector is disengaged, as will be described in more detail hereinbelow.

OPERATION

The fluid connector 10 is separated by use of an installation tool that pushes the valve portion into the sleeve and the lock ring allows the male portions and female portions to be separated. The installation tool 13 consists of cylindrical member or pushout rod 72 whose outer diameter complements the inner diameter of bore 20 and outer sleeve 74. The installation tool attaches to the female housing 16 at the attachment points 76 and 78 formed in the flange 81 of housing 16 by machine bolts (not shown). (see FIGS. 4 and 5) Thread 80 of attachment bolt 180 is central to axis B and is contained within the installation tool 13 and fits into a mating female thread 82 formed on the end of valve member 22. Prior to seperation the attachment bolt 180 is screwed into valve member 22 to securely fasten the end of the pushout rod 72 to the valve member 22. Fluid leakage along the attachment bolt 180 during the translation of the O-rings is prevented by means of an O-ring 181, located in a face groove on pushout rod 72, that seals against the face of valve member 22. When the cylindrical member 72 is forced forward to slide longitudinally along the sliding surfaces of bore 20 and sleeve 24, the cylindrical valve 22 is displaced so that the O-rings 86 and 88 displace O-rings 90 and 92 straddle passageways 26 (see FIGS. 2 and 3). The O-rings 90 and 92 now in the new position bear against the inner diameter or surface 25 for sealing purposes and the O-rings 86 and 88 straddle the end of passageway 26.

Figure 2:
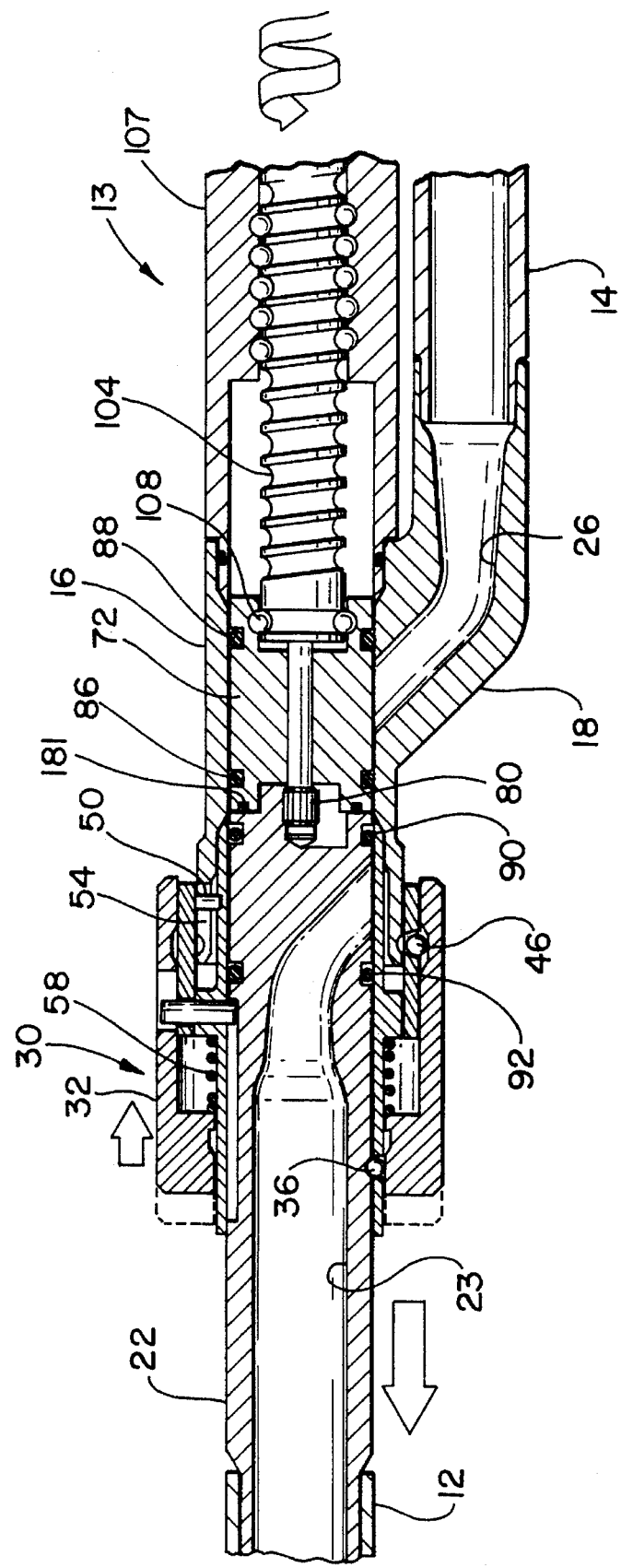
FIG. 2 is a partial view in section showing the details of FIG. 1 illustrating the installation tool in operation.
Figure 3:
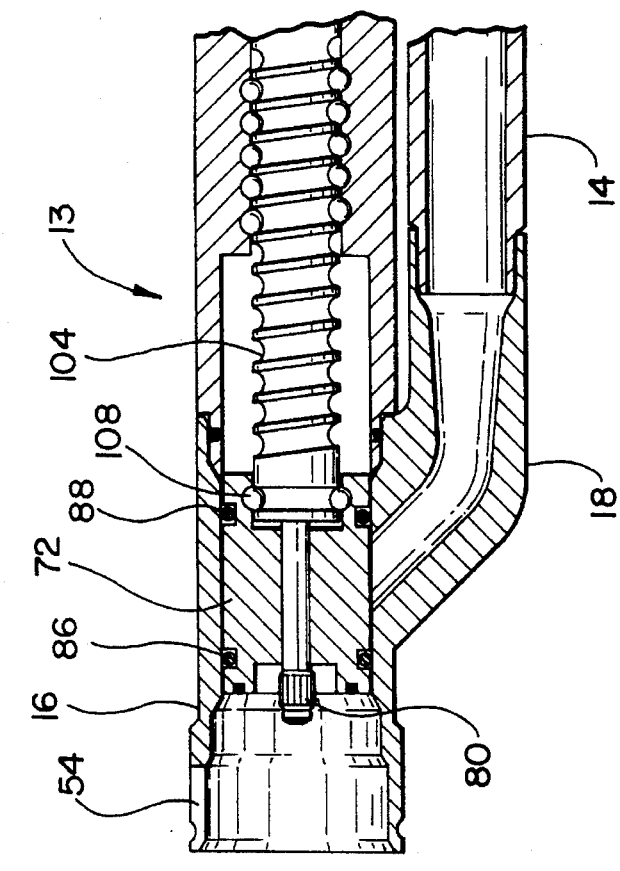
FIG. 3 is a partial view in section showing the in-line connector of FIG. 1 separated.
Figure 3:
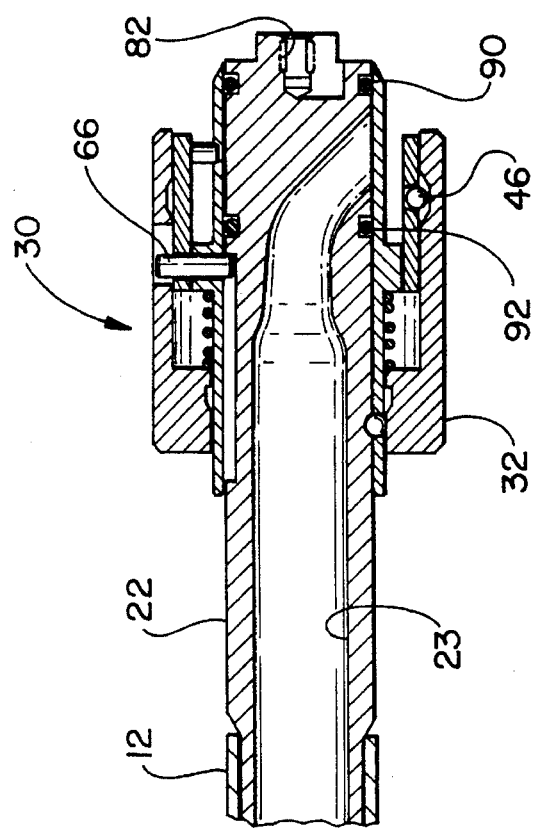
Figure 4:
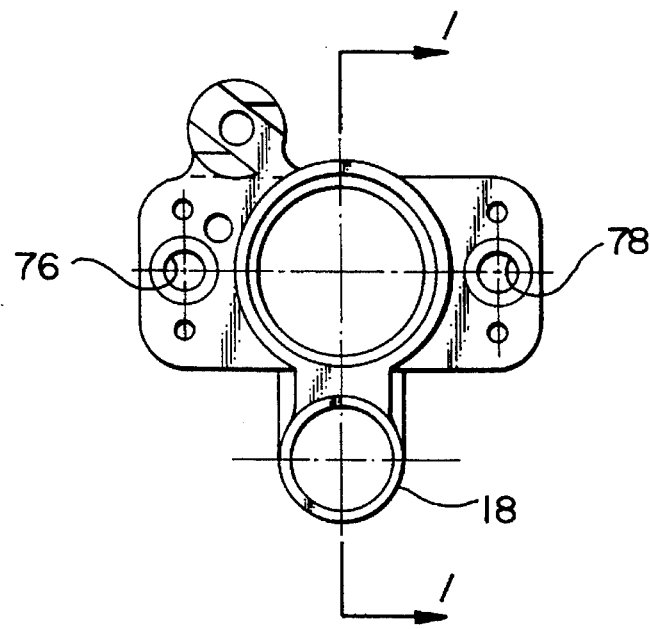
FIG. 4 is a end view of the in-line connector of FIG. 1.
Figure 5:
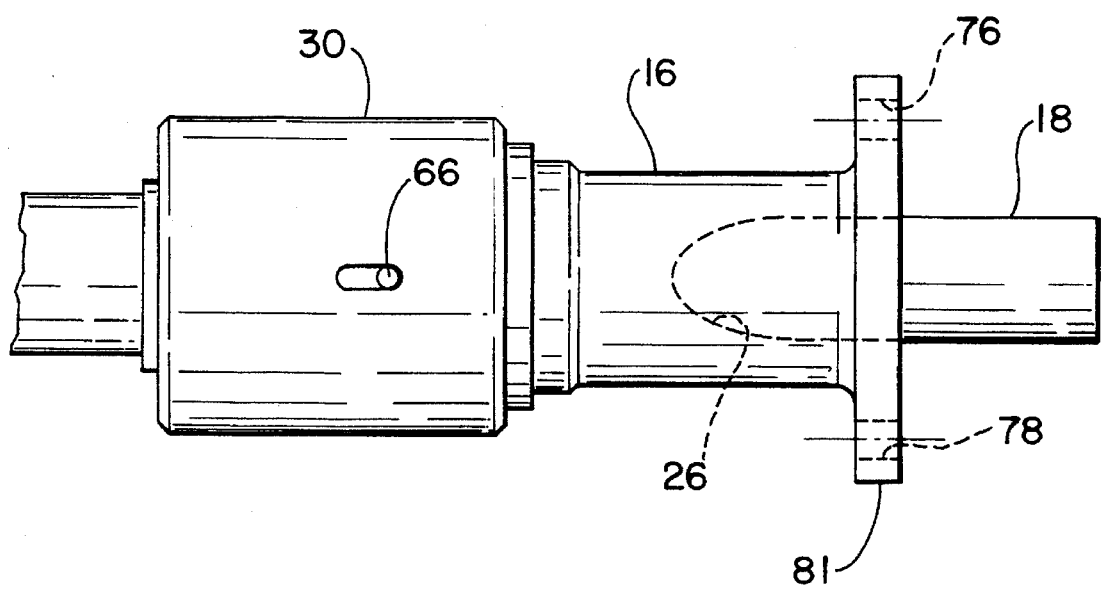
FIG. 5 is a partial top plan view of in-line connector of FIG. 1.

As is apparent from the foregoing and as best seen in FIGS. 2 and 3, the male and female portions of connector 10 are separated by moving the outer ring 32 of the locking ring 30 to the right untrapping the three locking balls 46. The outer ring 32 of the locking ring 30 can be moved to the right only when valve member 22 has been displaced to the left sufficiently far as to allow the three balls 36 to fall into the groove 182 therby freeing the outer ring 32. Female housing 16 can now be detached from male sleeve 24 by unscrewing attachment bolt 180 and allowing female housing to slide past pin 50 that travels through the open ended slot 54. This will disengage the male and female portions as shown in FIG. 3.

Leakage is prevented by the judicious locations of the O-rings. As noted, O-rings 90 and 92 now straddle passageway 23 and O-rings 86 and 88 now straddle passageway 26. This assures that leakage from either conduits 12 and 14 will not occur.

The installation tool may be hand driven by the operator or motor driven. When hand driven the installation tool merely consists of the cylindrical member 72 and sleeve 74 which locks into the connector 10 when operational. As a motor driven tool, the motor driven mechanism generally indicated by reference numeral 100 consists of the ball screw actuator 102 consisting of ball screw 104 ratably supported in bore 106 and the fixed ball screw nut 107 that may be formed integrally with sleeve 74. The ball screw nut supports a plurality of spherical balls 109 such that when ball screw 104 is rotated it will translate relative to ball screw nut 107. The opposite end of ball screw nut is fixedly secured to the cylindrical tool member 72 by the ball bearing 110 that is suitably retained in the recess 112 formed in the end of cylindrical member 72. Thusly, as the ball screw 104 rotates and translates this motion is converted into rectilinear motion of the cylindrical member 72 which acts as a pushout rod for positioning the female member 22 of connector 10.

The motor and control is schematically shown in FIG. 1 comprising a d.c. or a.c. motor that is connected to a power source which could be a battery through switch 110. Obviously, actuating switch 110 will cause the motor to rotate and actuate the installation tool 13. The powered mechanism is ideally suited for zero or near zero gravity applications. Since the forces are all reacted within the assembly, any translational or rotational forces are resisted by the actuator and not the person performing the disconnection. The reconnection of the male and female portions of the in-line connector is obtained by merely reversing the procedure.

Although this invention has been shown and described with respect to detailed embodiments thereof, it will be appreciated and understood by those skilled in the art that various changes in form and detail thereof may be made without departing from the spirit and scope of the claimed invention.

I claim:

1. A maintainable in-line fluid connector for a flexible or semi-flexible conduit having an upstream portion and downstream portion comprising a female housing having a central open ended bore and a branch portion, a downstream portion of said conduit connected to said branch portion, a detachable mating male portion comprising a cylindrical valve member and a sleeve surrounding a portion of said valve member disposed in sliding relationship with said sleeve and said male portion attached to said female housing, said upstream portion of said conduit connected to said valve portion, fluid conducting passageway in said valve member and additional fluid conducting passageway disposed in said branch portion angularly disposed relative to said fluid conducting passageway fluidly connecting said upstream portion and downstream portion of said conduit, in combination with an installation tool having a pushout rod having an outer diameter complementing the diameter of said bore for pushing said valve member axially, and seal means on said valve portion and on said pushout rod for straddling the ends of a passageway formed in said valve portion and said additional fluid conducting passageway formed in said branch portion whereby said female portion and said male portion can be separated and fluid in said upstream portion and downstream portion of said conduit is prevented from leaking through said in-line fluid connector.

2. A maintainable in-line fluid connector for a flexible or semi-flexible conduit as claimed in claim 1 including releasable means for locking said female housing to said male portion.

3. A maintainable in-line fluid connector for a flexible or semi-flexible conduit as claimed in claim 2 wherein said seal means includes a pair of axially spaced seals disposed on the outer diameter of said valve member in straddle relationship with the end of the passageway in said branch portion in one position and in sealing relationship with said sleeve in another position of said valve member.

4. A maintainable in-line fluid connector for a flexible or semi-flexible conduit as claimed in claim 3 wherein said seal means includes an additional pair of axially spaced seals disposed on the outer diameter of said pushout rod for straddling said end of the passageway in said branch portion when said installation tool is operational.

5. A maintainable in-line fluid connector for a flexible or semi-flexible conduit as claimed in claim 4 wherein said seal means are O-seals.

6. A maintainable in-line fluid connector for a flexible or semi-flexible conduit as claimed in claim 5 including an actuator for translating said pushout rod and motor means for controlling said actuator whereby said valve member is translated upon actuation of said motor means.

7. A maintainable in-line fluid connector for a flexible or semi-flexible conduit as claimed in claim 6 including limiting means on said in-line connector for limiting the travel of said valve member.

8. A maintainable in-line fluid connector for a flexible or semi-flexible conduit as claimed in claim 7 wherein said limiting means includes a pin extending radially inwardly from said sleeve and engaging an axial slot formed on the outer periphery of said valve member.

9. A maintainable in-line fluid connector for a flexible or semi-flexible conduit as claimed in claim 8 wherein said pushout rod includes an axially extending screw thread centrally disposed on one end thereof and a complementary female screw thread formed on the end of said valve member, whereby inadvertent separation of components of the connector during pushout is prevented.

10. A maintainable in-line fluid connector for a flexible or semi-flexible conduit as claimed in claim 9 including a flange formed on the end of said in-line connector and a mating flange formed on said pushout rod, and attaching means for attaching said flange and said mating flange for placing said installation tool in operational position.

* * * * *